(12) United States Patent
Graceffa et al.

(10) Patent No.: US 11,144,912 B2
(45) Date of Patent: Oct. 12, 2021

(54) AUTHENTICATION BYPASS SOFTWARE FOR MERCHANT TERMINALS

(71) Applicants: Stephen A. Graceffa, Providence, RI (US); Yuxuan Zhang, Jersey City, NJ (US)

(72) Inventors: Stephen A. Graceffa, Providence, RI (US); Yuxuan Zhang, Jersey City, NJ (US)

(73) Assignee: MakeCents LLC, Providence, RI (US)

( * ) Notice: Subject to any disclaimer, the term of this patent is extended or adjusted under 35 U.S.C. 154(b) by 478 days.

(21) Appl. No.: 15/978,874

(22) Filed: May 14, 2018

(65) Prior Publication Data

US 2018/0330365 A1  Nov. 15, 2018

Related U.S. Application Data (60) Provisional application No. 62/505,190, filed on May 12, 2017.

(51) Int. Cl.

| | |
|---|---|
| *G06Q 20/40* | (2012.01) |
| *G06Q 20/38* | (2012.01) |
| *H04L 29/06* | (2006.01) |
| *G06Q 20/20* | (2012.01) |
| *G06Q 20/12* | (2012.01) |
| *G06Q 20/06* | (2012.01) |
| *G06Q 20/36* | (2012.01) |
| *G07F 9/04* | (2006.01) |
| *G06Q 20/34* | (2012.01) |

(Continued)

(52) U.S. Cl.
CPC ......... *G06Q 20/381* (2013.01); *G06Q 20/065* (2013.01); *G06Q 20/12* (2013.01); *G06Q 20/202* (2013.01); *G06Q 20/356* (2013.01); *G06Q 20/3676* (2013.01); *G06Q 20/4014* (2013.01); *G07F 5/24* (2013.01); *G07F 9/04* (2013.01); *H04L 63/0884* (2013.01); *H04W 12/06* (2013.01); *G06Q 2220/00* (2013.01); *H04L 2463/102* (2013.01); *H04W 12/72* (2021.01)

(58) Field of Classification Search
CPC ............. G06Q 20/381; G06Q 20/3676; G06Q 20/356; G06Q 20/202; G06Q 20/12; G06Q 20/065; G06Q 20/4014; G06Q 2220/00; G07F 9/04; G07F 5/24; H04W 12/06; H04W 12/72; H04L 63/0884; H04L 2463/102
USPC ......................................................... 705/21
See application file for complete search history.

(56) References Cited

U.S. PATENT DOCUMENTS

| | | | |
|---|---|---|---|
| 2002/0111919 A1* | 8/2002 | Weller ................... | G06Q 20/40 705/67 |
| 2014/0244487 A1* | 8/2014 | Seligmann ........... | G07G 1/0009 705/39 |

OTHER PUBLICATIONS

Nakamoto, Satoshi. "Bitcoin: A peer-to-peer electronic cash system." (2008).

* cited by examiner

*Primary Examiner* — Garcia Ade
(74) *Attorney, Agent, or Firm* — St. Onge Steward Johnston & Reens LLC (57) ABSTRACT

A system for returning change electronically to a consumer as a result of a cash transaction is provided. The system uses a merchant terminal by bypassing default funds availability authorization performed in consumer to merchant transfers by the terminal. The terminal therefore enables transfer funds from merchant to consumer in an amount which is associated with change due to the consumer upon receipt of the appropriate request and consumer account identifier. In (Continued)

particular aspects, the change is returned in a cryptocurrency.

27 Claims, 3 Drawing Sheets

(51) Int. Cl.
*G07F 5/24* (2006.01)
*H04W 12/06* (2021.01)
*H04W 12/72* (2021.01)

AUTHENTICATION BYPASS SOFTWARE FOR MERCHANT TERMINALS

FIELD OF THE INVENTION

The following relates to a system for electronically transferring funds to a consumer as a result of a cash transaction.

BACKGROUND OF THE INVENTION

Existing retail locations will normally accept cash, credit, debit and gift card payment methods. Often times, this process is handled via POS (Point of Sale) device, which may be purpose build or may be a computer with specialized software thereon. This POS system is often linked to a terminal which is either built into the POS system or is a separate module. Most terminals are those devices that consumers will swipe their credit card into and/or enter debit card information.

Payment terminals today serve a key point-of-sale functions of completing a payment by brokering an exchange between the consumer's credit card and the card issuer; and enable consumers to interact with various store, or third-party-based loyalty/rewards programs. In regards to the former function, merchants partner with third-party payment companies to transmit, route, authorize and authenticate a payment transaction. These transactions are performed using credit cards, debit cards and gift cards. These payments are initiated at the terminal, either by swiping a card with a magnetic strip, inserting a card that has an EMV chip, or via contactless payment using NFC (e.g., ApplePay and AndroidPay).

In all of these types of transactions, funds are being transferred from the consumer (or their bank account) to a merchant (or its bank account). In this regard, the merchant bank account needs to be sure that the consumer account will in fact pay for the goods and this is confirmed to the POS device so that the consumer can leave the store having actually paid the merchant.

However, the challenge is that this existing method works for situations where it is the consumer that owes the merchant money and the terminal provides for authentication and authorization steps. However, when the consumer is owed money as a result of a cash transaction, different needs arise. Thus, there is a need to adapt existing terminals and supporting systems to enable transfers of funds in the alternative direction and to provide an improved payment system that enables the consumer to receive funds electronically from the merchant as a result of cash transactions.

SUMMARY OF THE INVENTION

It is therefore an object of the invention provide a system that modifies existing payment terminals to enable them to transfer money from the merchant to the consumer when the merchant owes the consumer change as a result of a cash transaction.

It is a further object to enable return of change as a result of a cash transaction via electronic funds transfer.

These and other objects are achieved by providing a payment processing system for bypassing default funds availability authorization and, in certain cases, authentication steps implemented by a merchant terminal to transfer funds from a merchant to a consumer. The system includes a point of sale device having software executing thereon for receiving purchase indications of goods and/or services to be purchased by a consumer. A merchant terminal is in communication with the point of sale device and is configured to perform authentication and authorization steps to permit electronic transfers to transfer funds from the consumer to the merchant, said merchant terminal further configured to receive an input indicative of a request to return change to the consumer via electronic transfer and to bypass the authentication and authorization steps, the request indicative of a consumer account. The point of sale device further is configured to receive a payment indication of cash presented for payment of the items, the indication is transmitted to the merchant terminal. The merchant terminal, upon receipt of the payment indication, bypasses the authentication and authorization steps of the merchant terminal and generates a terminal request to transfer funds from a merchant bank to a consumer bank based on the request to return change to the consumer. System software executes on a server and receiving the terminal request and further brokering an exchange of funds from the merchant to the consumer based on the terminal request.

In some aspects, the point of sale device processes a plurality of transactions result in transfer of funds from the merchant to the consumer bank wherein the consumer bank is the same bank and, wherein the server providing a portal which may be e.g. via a mobile application or web portal accessible by the consumer which enables the consumer to access funds held by the consumer bank. In other aspects, the portal offers goods or services for purchase by the consumer using funds of the consumer bank. In yet further aspects, the portal offers securities for purchase by the consumer using funds of the consumer bank.

In some aspects a payment processing system is provided including a point of sale device having software executing thereon for receiving purchase indications of goods and/or services to be purchased by a consumer. A terminal is in communication with the point of sale device and configured to perform authentication and authorization steps to permit electronic transfers to transfer funds from consumer to merchant, said terminal further configured to receive an input indicative of a request to return change to the consumer via electronic transfer from merchant to the consumer and to bypass the authorization step, the request indicative of a consumer account. The point of sale device is configured to receive a payment indication of cash presented for payment for the goods and/or services. The indication is transmitted to the terminal. The terminal, upon receipt of the payment indication and the request bypasses the authorization step of the terminal and generates a terminal request to transfer funds from a merchant account to a consumer account based on an amount of change due to the consumer. System software executes on a server and receives the terminal request and further brokers an exchange of funds from the merchant account to the consumer account based on the terminal request.

In particular aspects, the authorization step is performed by the terminal transmitting a consumer's unique identifier to the server which returns an authentication to the terminal when the unique identifier is authentic. In other aspects the point of sale device processes a plurality of transactions result in transfer of funds from the merchant account to the consumer account and further includes the server providing a portal accessible by the consumer which enables the consumer to access funds held by the consumer account. In other aspects the portal offers goods or services for purchase by the consumer using funds of the consumer account. In particular aspects the portal offers securities for purchase by the consumer using funds of the consumer account. In certain aspects the funds transferred from the merchant account to the consumer account are a cryptocurrency. In certain aspects the cryptocurrency is valued at one unit of cryptocurrency to one dollar. In still other aspects the funds are converted from dollars to cryptocurrency prior to transfer to the consumer account.

In other aspects a payment processing system is provided for bypassing default funds availability authentication and authorization steps implemented by a merchant terminal. The system comprises a point of sale device having software executing thereon for receiving purchase indications of goods and/or services to be purchased by a consumer. A terminal is in communication with the point of sale device and is configured to perform authentication and authorization steps to permit electronic transfers to transfer funds from the consumer to the merchant. The terminal is further configured to receive an input indicative of a request to return change to the consumer via electronic transfer and to bypass the authorization step. The request is indicative of a consumer account. The point of sale device is configured to receive a payment indication of cash presented for payment of the goods and/or services. The indication is transmitted to the terminal. The terminal, upon receipt of the payment indication and the request, bypasses the authorization step of the terminal and generates a terminal request to transfer funds from a merchant account to a consumer account based on an amount of change due to the consumer, the terminal brokers an exchange of funds from the merchant account to the consumer account based on the terminal request.

In further aspects a payment processing system for returning change electronically to a consumer is provided. The system includes software which executes on a point of sale device and receives purchase indications of goods and/or services to be purchased by a consumer. The software is in communication with a payment terminal which performs authentication and authorization steps to permit electronic transfers to transfer funds from the consumer to the merchant, the authentication step being performed to verify a consumer account and the authorization step being performed to verify funds availability in the consumer account for purposes of transfer to a merchant account to purchase the goods and/or services. The software receives a payment indication of cash presented for payment of the goods and/or services and a request indicative of a consumer account. The software further generates a request to return change to the consumer via electronic transfer from the merchant account to the consumer account and to bypass the authorization step of the terminal such that the terminal bypasses the authorization step and transfers funds from the merchant account to the consumer account in an amount associated with the request to return change to the consumer.

In particular aspects the authorization step is performed by the terminal transmitting a consumer's unique identifier to a server which returns an authentication to the terminal when the unique identifier is authentic. In other aspects the request indicative of a consumer account indicates an account number which is the unique identifier. In further aspects software executes on a server and receiving the terminal request and further brokers an exchange of funds from the merchant account to the consumer account based on the terminal request. In further aspects the terminal brokers an exchange of funds from the merchant account to the consumer account based on the terminal request.

In further aspects a system is provided with one or more computers which are configured to communicate with one or more servers associated with payment networks for processing funds transfers between two or more accounts. The one or more computers upon receiving an indication of cash presented for payment of goods and/or services and an account identifier, the one or more computers are configured to bypass a default funds availability authorization step implemented by a payment processing terminal when transferring funds from consumer merchant. The bypass implemented prior to transfer of funds from a merchant to a consumer through use of at least one of the payment networks.

In particular aspects the payment network is operated by a decentralized network of computing devices operating a cryptographic blockchain protocol.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views. The following examples are presented to further illustrate and explain the present invention and should not be taken as limiting in any regard.

Figure 1:
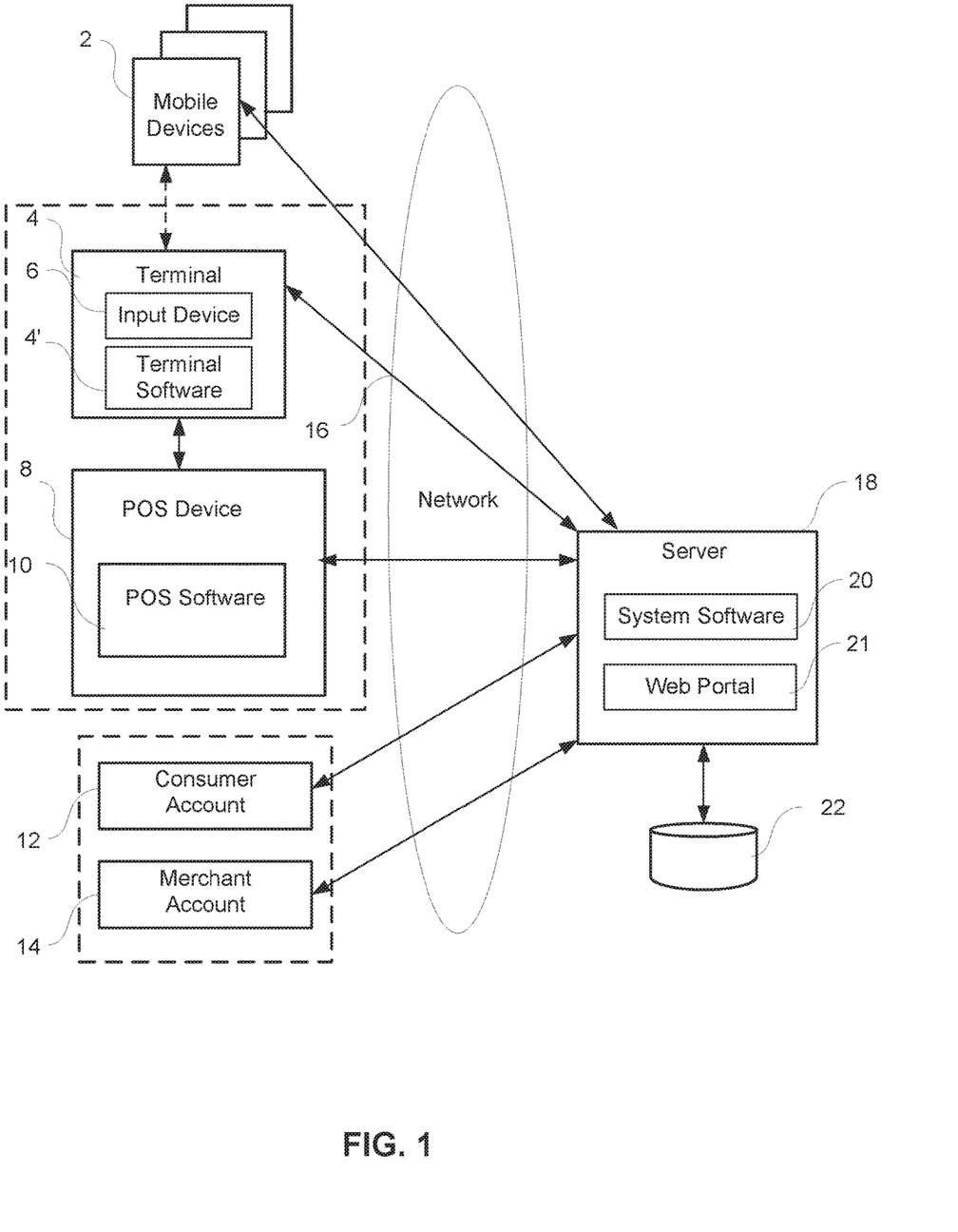
FIG. 1 is a functional flow chart according to the present invention.

As seen in FIG. 1, the Point of Sale (POS) device 8 has software 10 executing thereon and is in communication with a terminal 4 with an input device 6. The input device is a device that allows the consumer to provide the terminal with information which enables the funds transfer described herein. As an example, the input device 6 may be a keypad, a scanner, a magnetic card reader, a chip reader, a NFC, Bluetooth or other wireless communication system and others. In certain embodiments, a mobile device 2 can communicate with the terminal using NFC (near field communication). The POS device 8 enables the merchant to input goods and/or services that are being sold to the consumer.

The merchant terminal 4 is performs authorization and authentication steps for the purposes of normal credit or debit card transactions. This terminal can also be configured to accept contactless or Near Field Communications (NFC) payments. The authorization stage of a typical credit card transaction can involve the merchant obtaining approval for payment from the card issuing bank. In certain embodiments, the authorization process involves the following steps: (1) The cardholder presents their card for payment to the merchant at the point of sale. (2) After the cardholder first interacts with the terminal, the customer's card details are sent to the acquiring bank (or its acquiring processor) via an Internet connection or a phone line. (3) The acquiring bank or processor forwards the card details to the cardholder's credit card network. (4) The credit card network clears the payment and requests payment authorization from the issuing bank. The authorization request includes the following: Card number; Card expiration date; Billing address—for Address Verification System (AVS) validation; Card security code—(i.e., CVV); Payment amount.

In a typical credit card transaction the terminal 4 also performs authentication. In the authentication stage, the issuing bank verifies the validity of the customer's card using fraud protection tools such as the Address Verification Service (AVS) and card security codes such as CVV, CVV2, CVC2 and CID. There are a number of steps in this process. The issuing bank receives the payment authorization request from the credit card network. The issuing bank validates the credit card number, checks the amount of available funds, matches the billing address to the one on file and validates the CVV number. The issuing bank approves, or declines, the transaction and sends back the appropriate response to the merchant through the same channels: Credit card network and acquiring bank or processor. Once the merchant receives the authorization, the issuing bank will place a hold in the amount of the purchase on the cardholder's account. The merchant's terminal will collect all approved authorizations to be processed in a "batch" at the end of the business day. The merchant provides the customer with a receipt at completion of the sale. This process varies only slightly, depending on the merchant, the type of card being used and the particular third-party payment processor involved. This system works, but it still is vulnerable to various forms of fraud and attack—in part because of the technical limitations inherent in any electronic system and because the system is substituting physical cash with a digitally enabled monetary proxy which is predicated on a chain of trust that exists between multiple parties (e.g., acquiring banks, issuing banks, cardholders, merchants, payment gateways and card associations).

Although this process may work well for the electronic transfer of funds from the consumer to merchant, it does not work in the reverse direction. Particularly, terminals are generally configured to work in all electronic transactions. On the other hand, there is still significant use of cash in day to day transactions. Often, the speed of such transactions is frustrated by the need to count out and return change. But, at the same time, the way in which the transfer of funds is authorized is different than traditional merchant terminals operate.

The terminal 4 described herein and the POS software 10 are configured to work in a way that the authentication and authorization processes are avoided in certain transactions while enabling the speed of electronic return of change. Therefore, customers will use cash to pay for their transactions, eliminating most of the elements in the trust chain, and greatly reducing the chances and effects of errors and fraud. Customers still interact with the payment terminal to enable funds to be transferred back to the customer, but because there is no monetary proxy, the authorization step can be avoided. The transaction is already authorized by the transfer of paper money from the customer to the cashier. The authentication stage, though not entirely removed, is vastly simplified. Therefore, the customer interacts with the input device 6 to receive user data for the consumer. In some embodiments, the customer a) enters their phone number; b) has the terminal scan a unique bar code; or c) uses contactless payment enabled via a mobile smartphone application. Other entries are contemplated, but the key is that the terminal will be able to know which account the change is being transferred to. The customer's unique identifier is then transmitted to the server 18 via an authentication API which validates the user. The user's authentication status is sent back to the payment terminal 4. If the system does not recognize the user, the terminal alerts the user and prompts them to try again. If the user is authenticated, the terminal then sends a code to the merchant POS 8 requesting the total amount and tendered amount. This information is then displayed on the terminal 4, allowing the customer to decide if they would prefer sending all the change from the transaction or just the coins to their account. The payment terminal sends these three values, along with other transaction metadata to the API which is stored by the system storage 22 and use later for invoicing the merchant for payment of the customer's change, reporting of transaction data, and similar functions.

Bypassing the normal payment process, and all its associated steps and parties, vastly speeds up the transaction process. It virtually eliminates fraud and theft, along with the payment of processing fees that merchants typically incur. It does all this while using industry-standard payment terminals, made popular by companies such as Verifone and Ingenico.

Once the merchant has entered the goods/services sold into the POS device 8, the terminal will receive a request to return change to the consumer bank account 12. This request may be the consumer's phone number or other data to indicate the bank account 12. The consumer would have paid cash at this point, thus the POS device would receive an indication from the clerk of the amount of cash tendered. The change amounts would be calculated and the user can confirm via the terminal 4. Thus, at this point, the electronic transfer is brokered by the terminal 4 without performing typical authentication and authorization of the credit card that would normally be required to complete an electronic transfer via the terminal 4. As shown in FIG. 1, the terminal communicates with the consumer 12 and merchant 14 accounts via the server 18 over network 16. However, it is understood that the terminal 4 may communicate directly with the appropriate banks 12/14 (or via appropriate payment networks associated with the banks). The communication by the terminal may be done over a network 16. It is also contemplated that the terminal can be part of the overall POS system. It is further contemplated that the POS system can directly communicate with the appropriate banks/payment networks to process the funds transfer thereby using the terminal to receive the request to return change electronically and using the POS system to communicate with the payment network to authenticate the account and then transfer the funds without performing the authorization steps traditionally done by terminals and/or terminals intergrated into POS system. It is understood that the network 16 may comprise one or more different types of network connections and communications mechanisms as known to those of skill in the art. It is understood that the consumer 12 and merchant 14 accounts may be at the same financial institution or different financial institution or may be accounts which are kept in cryptocurrency and tracked by the server 18 which may include one or more servers. One example of the payment network is shown in FIG. 1 where the terminal 4 communicates with the server 18 to allow transfers between accounts 12/14. It is however understood that the terminal may communicate directly with the appropriate banking institutions or their payment processing networks without channeling communications through the particular server.

In the implementation where the server 18 is multiple servers, this can allow the system software 20 of each server to implement a blockchain enabled protocol for cryptocurrency transfers which allows for a distributed ledger to be created to track and determine ownership of cryptographic assets (cryptocurrency).

In certain embodiments, the consumer bank is maintained by the service provider such that change from all transactions are deposited to a single bank and the user can login via web or application portal to request transfer of funds to an individual bank. Therefore the system software 20 stores account records on database 22 to enable the funds for each user to be identified within a single bank account. As shown in FIG. 1, the mobile device may access the server and its system software 20 to request account balances, transfer funds or otherwise access the user account.

A web interface is provided that allows the consumer to review their balance and make transfers to other accounts designated by the consumer. In other embodiments, the web interface allows the consumer to purchase goods or services via an online marketplace or alternately, securities may be purchased such as stocks and bonds.

Once the transfer has occurred, confirmation messages are sent to the user and the POS 8. The user may receive a text message or other alert on their mobile phone that indicates that change was successfully transferred to their account.

Figure 2:
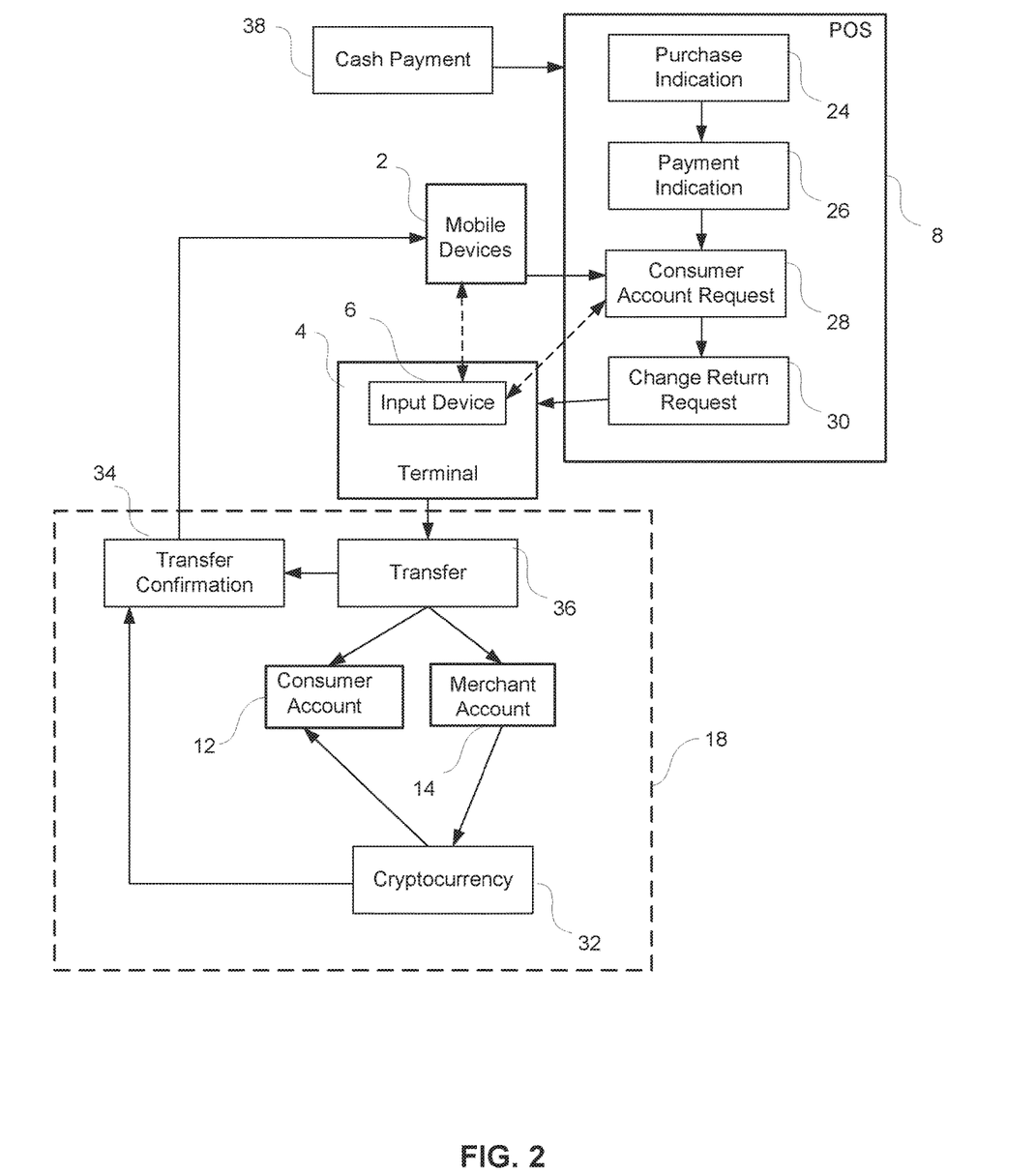
FIG. 2 is a functional flow chart showing further features of FIG. 1.

As shown in FIG. 2, the POS system at the merchant location receives the cash payment 38 after there is a purchase indication 24 for the goods/services being purchased such that a payment indication 26 is generated by the POS. The consumer can request return of change electronically via a mobile device 2 which may communicate directly with the POS or may communicated with the terminal via the input device 6 which communicates with the POS. In this case, the mobile device can instruct the POS/Terminal to return change electronically and provide the consumer account identifier in connection with that request 28 such that the POS generates a request to return change 30 which is transmitted to the Terminal 4. The terminal typically is used to process electronic payment transactions and thus is able to communicate with appropriate financial institutions to authenticate accounts and authorize funds transfers. In the typical scenario, funds are being transferred from consumer to merchant in the amount due. However, since the consumer is paying cash 38, the consumer is now owed money from the merchant. In this manner, the terminal can communicate with the merchant bank to transfer 36 funds from merchant to consumer account. In certain scenarios, the terminal can enable a withdrawal from the merchant account for purposes of purchasing a cryptocurrency 32. In this manner, the cryptocurrency 32 can be transferred to the consumer account. This is particularly useful for consumers who do not have or wish to utilize a traditional bank account. A confirmation 34 is generated and transmitted to the consumer's mobile device 2. In certain embodiments, a number of steps are performed by the system server 18 which communicates with the terminal to receive the transfer 36 request and then this server 18 updates the consumer/merchant accounts appropriately and generates and transmits the transfer confirmation 34.

Figure 3:
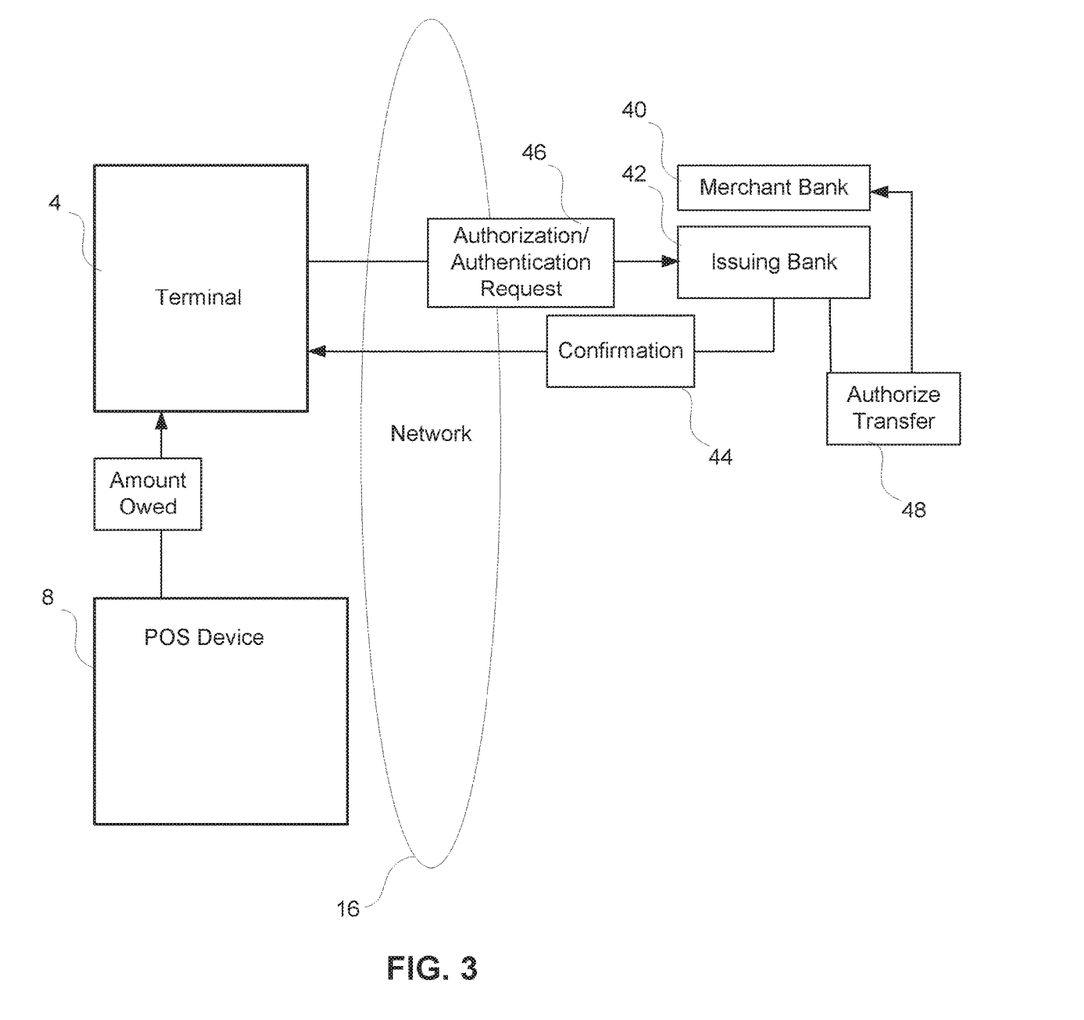
FIG. 3 is a functional flow chart showing authentication and authorization for transfer from consumer to merchant.

FIG. 3 shows a process whereby traditional funds transfers from consumer to merchant are processed electronically. The amount owed is transmitted from POS to terminal and this amount is that which is to be transferred from consumer to merchant bank. The terminal sends an authorization and authentication request to the issuing bank 42 which in most cases would be the consumer bank, however, the issuing bank can be associated with pre-paid gift cards that are not specifically linked to the consumer. The issuing bank 42 authenticates the account details e.g card number and PIN. The transfer is then authorized 48 which causes funds to be transferred to the merchant bank 40. A confirmation 44 is then sent to the terminal. It is also understood that this confirmation may be transmitted from the merchant bank 40 to the terminal 4. The terminal then generates a receipt which may be printed by the terminal 4 or by the POS device or otherwise generated such that it can be transmitted to the consumer. As described herein, the authorization request which involves authorizing the amount of funds to be transferred is bypassed by the terminal as instead of simply receiving the amount owed from the POS device, the amount owed indicates that the merchant needs to transfer money to the consumer, thus the terminal's authorization step is bypassed. The authorization involves verifying the consumer's unique identifier (which e.g. may be their account number and may include a PIN). This authorization is done by the terminal communicating with the system server 18 to verify the consumers unique identifier information. It is understood that the consumer account 12 and/or the merchant account 14 may be maintained on database 22 or the distributed ledger in the example of cryptographic assets. Alternately, the accounts 12/14 may be maintained by an appropriate financial institution and the payment network used to perform the transfer may be that which enables transfer between banks.

In particular aspects, the terminal is enabled to allow the POS system to identify the consumer's account—for example via a phone number or other identifier. This identifier is then sent from the POS system via the appropriate payment network for authentication to confirm the account is valid. Assuming the POS system has received an indication of cash having been presented, the POS system via the appropriate payment network will transfer the funds without doing the traditional authorization step performed for transfer from consumer to merchant.

It is understood that the amounts transferred herein may be less applicable fees and in some cases, the merchant account bears the cost of the fees which are deducted and held by the system account.

U.S. Pat. Pub. No. 2014-0244487 is incorporated by reference herein in its entirety. This publication describes additional features of the web interface and the mechanics of how funds transfers can be processed while using the bypass software described herein. "Bitcoin: A peer-to-peer electronic cash system" by Satoshi Nakamoto, dated Oct. 31, 2008 is also incorporated by reference herein in its entirety and a copy thereof is submitted with the IDS.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A payment processing system, the system comprising:
   a point of sale device having software executing thereon for receiving purchase indications of goods and/or services to be purchased by a consumer;
   a terminal in communication with the point of sale device and configured to perform authentication and authorization steps to permit electronic transfers to transfer funds from consumer to merchant, said terminal further configured to receive an input indicative of a request to return change to the consumer via electronic transfer from merchant to the consumer and to bypass the authorization step, the request indicative of a consumer account;
   said point of sale device configured to receive a payment indication of cash presented for payment for the goods and/or services, said indication transmitted to said terminal;
   said terminal, upon receipt of the payment indication and the request, bypassing the authorization step of said terminal and generating a terminal request to transfer funds from a merchant account to a consumer account based on an amount of change due to the consumer;

system software executing on a server and receiving the terminal request and further brokering an exchange of funds from the merchant account to the consumer account based on the terminal request.

2. The system of claim 1 wherein the authorization step is performed by the terminal transmitting a consumer's unique identifier to the server which returns an authentication to the terminal when the unique identifier is authentic.

3. The system of claim 1 wherein the point of sale device processes a plurality of transactions result in transfer of funds from the merchant account to the consumer account and further comprising the server providing a portal accessible by the consumer which enables the consumer to access funds held by the consumer account.

4. The system of claim 2 wherein the portal offers goods or services for purchase by the consumer using funds of the consumer account.

5. The system of claim 3 wherein the portal offers securities for purchase by the consumer using funds of the consumer account.

6. The system of claim 1 wherein the funds transferred from the merchant account to the consumer account are a cryptocurrency.

7. The system of claim 6 wherein the cryptocurrency is valued at one unit of cryptocurrency to one dollar.

8. The system of claim 6 wherein the funds are converted from dollars to cryptocurrency prior to transfer to the consumer account.

9. The system of claim 1 wherein said terminal is part of said point of sale device.

10. A payment processing system, the system comprising:
a point of sale device having software executing thereon for receiving purchase indications of goods and/or services to be purchased by a consumer;
a terminal in communication with the point of sale device and configured to perform authentication and authorization steps to permit electronic transfers to transfer funds from the consumer to the merchant, said terminal further configured to receive an input indicative of a request to return change to the consumer via electronic transfer and to bypass the authorization step, the request indicative of a consumer account;
said point of sale device configured to receive a payment indication of cash presented for payment of the goods and/or services, said indication transmitted to said terminal;
said terminal, upon receipt of the payment indication and the request, bypassing the authorization step of said terminal and generating a terminal request to transfer funds from a merchant account to a consumer account based on an amount of change due to the consumer, the terminal brokering an exchange of funds from the merchant account to the consumer account based on the terminal request.

11. The system of claim 10 wherein the authorization step is performed by the terminal transmitting a consumer's unique identifier to the server which returns an authentication to the terminal when the unique identifier is authentic.

12. The system of claim 10 wherein the point of sale device processes a plurality of transactions result in transfer of funds from the merchant account to the consumer account and further comprising the server providing a portal accessible by the consumer which enables the consumer to access funds held by the consumer account.

13. The system of claim 10 wherein the funds transferred from the merchant account to the consumer account are a cryptocurrency.

14. The system of claim 13 wherein the cryptocurrency is valued at one unit of cryptocurrency to one dollar.

15. The system of claim 13 wherein the funds are converted from dollars to cryptocurrency prior to transfer to the consumer account.

16. The system of claim 10 wherein said terminal is part of said point of sale device.

17. A payment processing system for returning change electronically to a consumer, the system comprising:
software which executes on a point of sale device and receives purchase indications of goods and/or services to be purchased by a consumer;
said software in communication with a payment terminal which performs authentication and authorization steps to permit electronic transfers to transfer funds from the consumer to the merchant, the authentication step being performed to verify a consumer account and the authorization step being performed to verify funds availability in the consumer account for purposes of transfer to a merchant account to purchase the goods and/or services;
said software receiving a payment indication of cash presented for payment of the goods and/or services and a request indicative of a consumer account, the software further generating a request to return change to the consumer via electronic transfer from the merchant account to the consumer account and to bypass the authorization step of the terminal such that the terminal bypasses the authorization step and transfers funds from the merchant account to the consumer account in an amount associated with the request to return change to the consumer.

18. The system of claim 17 wherein the authorization step is performed by the terminal transmitting a consumer's unique identifier to a server which returns an authentication to the terminal when the unique identifier is authentic.

19. The system of claim 17 wherein the funds are a cryptocurrency.

20. The system of claim 17 wherein the cryptocurrency is valued at one unit of cryptocurrency to one dollar.

21. The system of claim 18 wherein the funds are converted from dollars to cryptocurrency prior to transfer to the consumer account.

22. The system of claim 18 wherein the request indicative of a consumer account indicates an account number which is the unique identifier.

23. The system of claim 17 further comprising system software executing on a server and receiving the terminal request and further brokering an exchange of funds from the merchant account to the consumer account based on the terminal request.

24. The system of claim 17 wherein the terminal brokers an exchange of funds from the merchant account to the consumer account based on the terminal request.

25. The system of claim 17 wherein the payment terminal is part of the point of sale device.

26. A system for processing payments comprising:
one or more computers which are configured to communicate with one or more servers associated with payment networks for processing funds transfers between two or more accounts, the one or more computers upon receiving an indication of cash presented for payment of goods and/or services and an account identifier, the one or more computers are configured to bypass a default funds availability authorization step implemented by a payment processing terminal when transferring funds from consumer merchant, the bypass implemented prior to transfer of funds from a merchant to a consumer through use of at least one of the payment networks.

27. The system of claim 26 wherein the payment network is operated by a decentralized network of computing devices operating a cryptographic blockchain protocol.

\* \* \* \* \*